United States Patent [19]

Malec

[11] Patent Number: 4,465,013

[45] Date of Patent: * Aug. 14, 1984

[54] TIRE MONITOR

[75] Inventor: Jerry P. Malec, Omaha, Nebr.

[73] Assignee: Allied Oil & Supply, Inc., Omaha, Nebr.

[*] Notice: The portion of the term of this patent subsequent to Mar. 8, 2000 has been disclaimed.

[21] Appl. No.: 344,211

[22] Filed: Jan. 29, 1982

Related U.S. Application Data

[63] Continuation-in-part of Ser. No. 228,253, Jan. 26, 1981, Pat. No. 4,375,788.

[51] Int. Cl.³ .............................................. B60C 23/04
[52] U.S. Cl. .................................. 116/34 R; 116/271; 73/146.8
[58] Field of Search ............... 116/34 R, 272, 271, 116/277; 73/146.3, 146.8; 137/227, 228, 229

[56] References Cited

U.S. PATENT DOCUMENTS

| | | | |
|---|---|---|---|
| 1,229,860 | 6/1917 | Ashelman | 73/146.8 |
| 2,325,415 | 7/1943 | McKinley | 116/271 |
| 2,505,118 | 4/1950 | Holmes | 116/271 |
| 2,800,795 | 7/1957 | Trinca | 73/146.3 |
| 3,357,240 | 12/1967 | Bordwick | 73/146.8 |
| 3,977,355 | 8/1976 | Lorenz | 116/34 R |
| 4,375,788 | 3/1983 | Malec | 73/146.8 |

FOREIGN PATENT DOCUMENTS 450235 7/1949 Italy .................................. 73/146.3

Primary Examiner—Charles Frankfort
Assistant Examiner—Denis E. Corr
Attorney, Agent, or Firm—Zarley, McKee, Thomte, Voorhees & Sease

[57] ABSTRACT

A tire monitor for use with a pair of pneumatic tires comprising a body member having a diaphragm valve mounted in a first chamber formed therein defining first and second chamber portions. A spring is provided in the first chamber portion for yieldably urging the diaphragm valve towards one end of the body member. A valve cap is secured to the other end of the body member and has first, second and third air passageways formed therein. A valve is connected to the third passageway for permitting air under pressure to be supplied to the second chamber portion at times. The diaphragm valve prevents communication between the first and second air passageways when the diaphragm valve is in a first position and also prevents communication between the third passageway and the first and second air passageways when the diaphragm valve is in its first position. The diaphragm valve permits communication between the first and second air passageways when the diaphragm valve is in its second position and permits communication between the third passageway and the first and second passageways when the diaphragm valve is in its second position. A visual indicator is mounted on the body member and is operatively connected to the diaphragm valve for indicating the relative position of the diaphragm valve with respect to the first and second air passageways.

3 Claims, 7 Drawing Figures

TIRE MONITOR

CROSS REFERENCE TO RELATED APPLICATION

This is a continuation-in-part of my previous U.S. patent application Ser. No. 228,253 filed Jan. 26, 1981 now U.S. Pat. No. 4,375,788.

BACKGROUND OF THE INVENTION

This invention relates to a tire monitor device and more particularly to a pressure equalizing valve for pneumatic tires which includes a visual display means.

A very large number of previous devices have been provided which attempt to either equalize the pressure between a pair of dual tires or to indicate to the operator that a low pressure condition exists in one or both of the tires. Disadvantages of certain of the prior art devices which equalize air between the dual tires are that they are not sufficiently sensitive to changes in tire pressure and certain of the devices permit the air in both tires to be lost if one of the tires experiences a sudden drop in pressure. A further disadvantage of some of the prior art devices is that they are not durable and frequently malfunction. A still further disadvantage of certain of the prior art devices is that they become contaminated with moisture and will freeze during periods of cold weather. Still another disadvantage in the prior art is that if the pressure sensing means thereof ruptures or fails due to a leak or poor seal, the device will sometimes permit complete loss of air from one tire.

A vast majority of the prior art devices which include means for warning the operator of low tire pressures is that they are electronic in nature and do experience some malfunctions. Further, the electronic devices are extremely expensive.

Applicant's earlier application discloses a device which is believed to represent a significant advance in the art. The instant invention is believed to be a significant advance over applicant's earlier invention in that a reduced number of parts are involved.

Therefore, it is a principal object of the invention to provide an improved tire monitor.

A further object of the invention is to provide a pressure equalizing valve for pneumatic tires which includes a visual display means.

A further object of the invention is to provide a tire monitor including means for supplying air to the tires without the necessity of a pressure gauge.

A further object of the invention is to provide a tire monitor which is durable in use and which includes means for preventing the accumulation of moisture within the display side of the mechanism.

A further object of the invention is to provide a tire monitor which includes means for maintaining the unpressurized side of the diaphragm at atmospheric pressure.

A still further object of the invention is to provide a tire monitor including a visual display means having a difference in colors so that the display means will be readily visible.

A further object of the invention is to provide a pressure equalizing valve for pneumatic tires which prevents loss of air from both tires should one of the tires experience a sudden drop in pressure.

A further object of the invention is to provide a device of the type described wherein the visual display means will not be damaged upon being exposed to high pneumatic pressures.

A still further object of the invention is to provide a pressure equalizing valve of the type described which is economical of manufacture.

These and other objects will be apparent to those skilled in the art.

SUMMARY OF THE INVENTION

Figure 1:
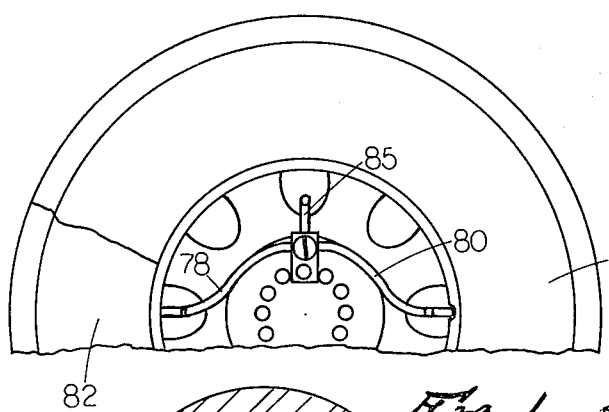
FIG. 1 is a partial elevational view of a pair of dual tires having the monitor of this invention mounted thereon.
Figure 2:
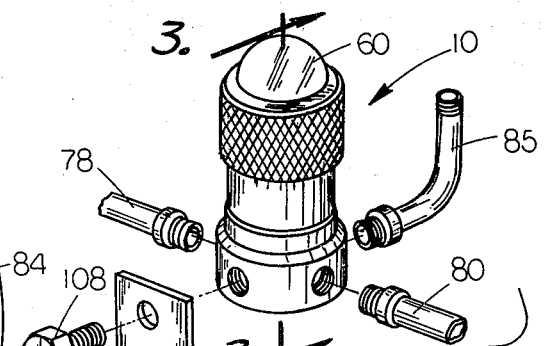
FIG. 2 is a perspective view of the tire monitor.

A tire monitor is described herein which includes a cylindrical body member having a first chamber formed therein. A spring biased diaphragm-valve is mounted in the first chamber and is urged towards one end of the body member. The diaphragm-valve is movable between open and closed positions relative to a pair of valve seats which are in communication with the tires. A visual display means is operated by a follower mechanism operatively connected to the diaphragm so that low pressure and predetermined adequate tire pressures are indicated by the visual display means. Means is also provided to supply air to the two tires through the body member.

DESCRIPTION OF THE PREFERRED EMBODIMENT

The numeral 10 refers generally to the tire monitor of this invention. Tire monitor 10 includes a cylindrical valve body or body member 12 having ends 14 and 16 respectively. As seen in the drawings, the ends 14 and 16 are provided with external threads 18 and 20 respectively. Additionally, one end of body member 12 is provided with internal threads 22. Body member 12 is provided with a cylindrical chamber 24 having piston 26 slidably mounted therein. Piston 26 includes a skirt portion 28 and a head portion 30. Head portion 30 is provided with an opening 32 adapted to receive one end of actuator rod 34. Spring 36 embraces one end of actuator rod 34 and is held in place by snap ring 38.

Figure 3:
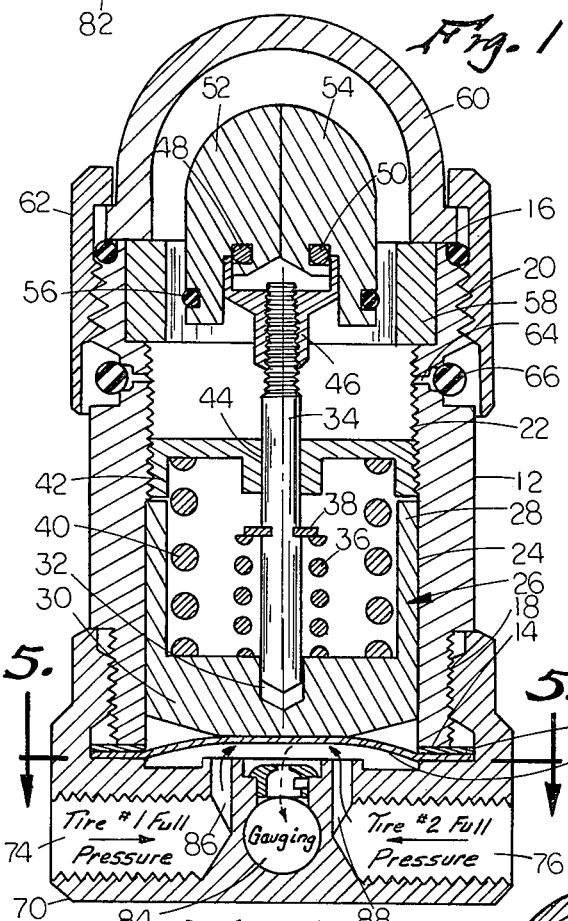
FIG. 3 is an enlarged sectional view seen on lines 3—3 of FIG. 2.

Spring 40 is positioned within the skirt portion 28 of piston 26 and is maintained therein by an adjustment screw 42 which is threadably secured to the threads 22 of valve body 12 as best seen in FIG. 3. Adjustment screw 42 has a central opening 44 formed therein to permit the actuator rod 34 to extend therethrough. One end of actuator rod 34 is threaded as seen in FIG. 3 and has a yoke 46 threadably mounted thereon. The upper end of yoke 46 pivotally engages pins 48 and 50 which extend through eye portions 52 and 54 respectively. O-ring 56 extends around the eye portions 52 and 54 to yieldably urge the eye portions 52 and 54 to the open position of FIG. 4 as will be described in more detail hereinafter. The opposite ends of pins 48 and 50 are exposed on opposite sides of the eye portions 52 and 54 and are pivotally mounted on and supported by frame 58 which is mounted in end 16 of valve body 12 as seen in FIG. 3.

Sight glass 60 is positioned on end 16 of valve body 12 and extends over the eye portions 52 and 54. Sight glass 60 is held in position by sight glass retainer 62 threadably mounted on the external threads 20 of valve body 12. As seen in FIG. 3, valve body 12 is provided with plurality of vents 64 formed therein which are normally sealed by means of an 0-ring 66. The numeral 68 refers to a washer which is positioned at end 14 of valve body 12. Valve cap 70 is threadably mounted on external threads 18 and maintains the flexible diaphragm 72 in position. Valve cap 70 is provided with a pair of air passageways 74 and 76 adapted to receive hoses or pipes 78 and 80 respectively which are in communication with the interior of tires 82 and 84 respectively. Valve cap 70 is also provided with an air passageway 84 formed therein which is in communication with valve stem 85. As best seen in FIG. 3, the air passageways 74 and 76 extend laterally in from the sides of the valve cap 70 and communicate with passageways 86 and 88 respectively. The ends of passageways 86 and 88 communicate with the pressurized side of the diaphragm 72 and are closed by the diaphragm 72 when the valve is in the position of FIG. 4.

Valve cap 70 is also provided with a bore 90 having a velocity valve 92 movably mounted therein. Velocity valve 92 includes a skirt portion 94 and a head portion 96. Head portion 96 is provided with an opening 98 which communicates with the interior portion 100 of velocity valve 92. Skirt portion 94 has an opening 102 formed therein which communicates with the central portion 100 of valve 92.

Figure 7:
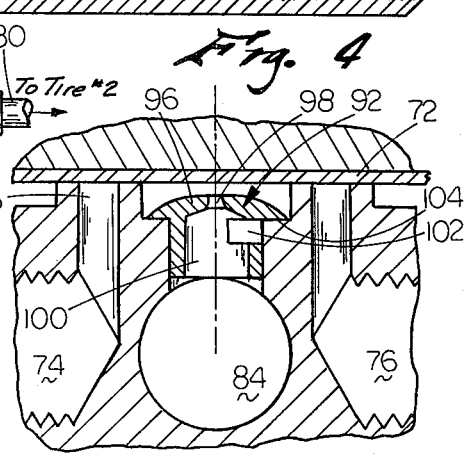
FIG. 7 is a view similar to that of FIG. 6 except that the velocity valve is in the closed position.

FIG. 7 illustrates the velocity valve 92 in the closed position and it can be seen that the engagement of the head portion 96 with the shoulder 104 of valve cap 70 prevents the flow of air therethrough inasmuch as opening 102 is sealed. It should be noted that opening 98 is not sealed by diaphragm 72 when the diaphragm seals passageways 86 and 88 when the diaphragm is in its lowest position. It should also be noted that there must be enough space under the diaphragm 72 when the diaphragm 72 is in its lowest position of travel to permit velocity valve 92 to raise and expose opening 102 in the side of the velocity valve 92 when air pressure is applied to passageway 84.

Figure 6:
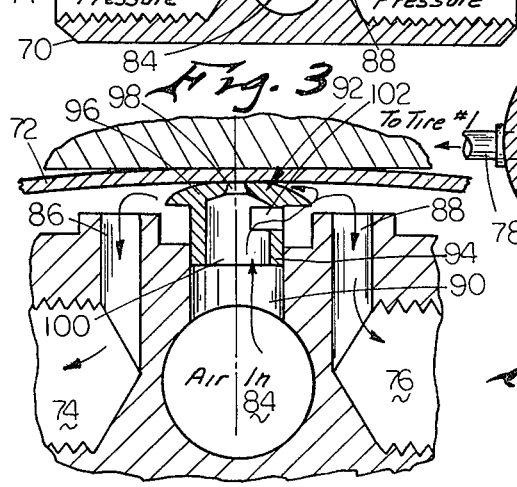
FIG. 6 is an enlarged sectional view illustrating the velocity valve in its open position.
Figure 5:
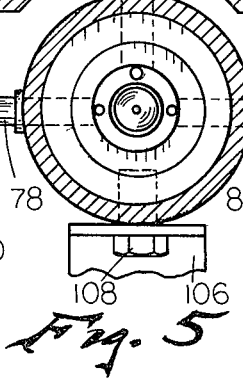
FIG. 5 is a sectional view seen on lines 5—5 of FIG. 3.

Velocity valve 92 is quite important in that it restricts the air attempting to leave passageway 84 such as when the tires are being gauged. As air enters passageway 84 which is when the tires are being re-charged wit air, the incoming air lifts the velocity valve 92 from its seated position of FIG. 7 to its raised position of FIG. 6 and permits air to enter the small chamber under the diaphragm 72 to eventually lift the diaphragm 72 upwardly from the ends of the passageways 86 and 88 thus recharging the tires. Without velocity valve 92, air could escape too rapidly from passageway 84 at times such as when a tire gauge is applied to port 84. When this happens, the air chamber under the diaphragm 72 exhausts rapidly thereby permitting the diaphragm 72 to close passageways 86 and 88 even though the tires connected to the passageways 86 and 88 are at the correct pressure level. Thus a false "no pressure" reading would be obtained by the tire. gauge being applied to passageway 84. Also, the display or eye portions 52 and 54 will also indicate an under pressurized system or a low air pressure in the tires being monitored.

The opening 98 in velocity valve 92 prevents a too rapid loss of air through passageway 84 at all times when a gauge is applied. The velocity valve 92 permits a full flow of air into the system from passageway 84 but restricts any air to a reduced small flow when air attempts to leave new passageway 84 for any reason. This reduced flow is sufficiently small so that diaphragm 72 is not dropped too quickly thereby closing passageways 86 and 88. The restricted air flow controlled by opening 98 is sufficient to operate a tire guage correctly.

The numeral 106 refers to an L-shaped bracket which is adapted to be secured to valve cap 70 by screw 108. Bracket 106 has an opening 110 fomred therein to permit the bracket to be secured to one of the lug bolts of tire 84.

When the bracket 106 and the tire monitor 10 are mounted on the dual tire installation as illustrated in FIG. 1, the sight glass 60 will be clearly visible to a person standing adjacent thereto.

The spring adjustment screw 42 is rotated to the desired position to achieve the proper calibration of the spring 40. The adjustment of the spring 40 will depend upon the particular dual tire installation. Air is supplied to the interior of the tires 82 and 84 by supplying air to the valve stem 85. Air entering passageway 84 from valve stem 85 will cause the velocity valve 92 to raise upwardly to the position of FIG. 6 so that opening 102 is in communication with the chamber portion beneath the diaphragm 72 so that air can enter the passageways 86 and 88 and thence pass outwardly to the respective tires. Air is supplied to the valve stem 85 until the eye portions 52 and 54 move to their closed positions as illustrated in FIG. 3. When sufficient air has been supplied to the tires 82 and 84 as determined by the calibration of the spring 40, the eye portions 52 and 54 will close which will indicate to the operator that sufficient air pressure is present and such is determined without the need of a tire pressure gauge.

Figure 4:
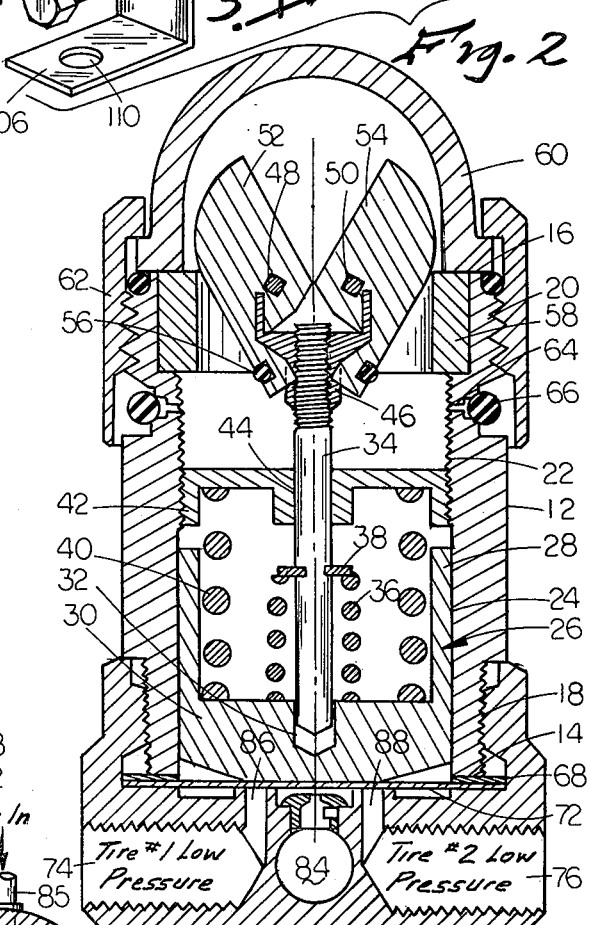
FIG. 4 is a view similar to that of FIG. 3 except that the visual display is in its open position.

Diaphragm 72 remains unseated from the ends of the passageways 86 and 88 during operation of the truck as long as the predetermined desirable pressure is present in the tires 82 and 84. The air pressure between the tires 82 and 84 will automatically equalize since air from one tire may pass to the other through the passageways 86 and 88. If one of the tires should experience a loss of pressure, the pressure at the pressurized side of the diaphragm will not be sufficient to maintain the piston 30 and diaphragm 72 in the position of FIG. 3 and the piston 26 and diaphragm 72 will move to the seating position on the passageways 86 and 88 as illustrated in FIG. 4. As the piston 26 moves from the position of FIG. 3 to the position of FIG. 4, actuator rod 34 is urged downwardly so that the eye portions 52 and 54 pivot to the open position illustrated in FIG. 4.

The movement of the piston 26 from the position of FIG. 3 to the position of FIG. 4 causes the eye portions 52 and 54 to move to the open position illustrated in FIG. 4 and the truck operator will be readily advised of the low tire pressure due to the fact that the "cat's-eye" configuration is visible. The relationship of the diaphragm 72 and the passageways 86 and 88 is such that a sudden loss of pressure in one of the tires will not cause the pressure in the other tire to also be lost since the spring 40 will urge the piston 26 downwardly to cause diaphragm 72 to move into sealing engagement with the ends of the passageways 86 and 88 when a predetermined loss of pressure is experienced as set by the spring adjustment nut 42. The atmospheric side of the diaphragm is vented by means of the port or passageway 64 which is closed by the O-ring 66. Thus, the atmospheric side of the diaphragm is exposed to the atmosphere to permit any accumulated air to escape from the interior of the device and to prevent water or contaminants from entering the mechanism.

It is very important to note that the device of this invention does not permit the complete loss of air from one tire should the apparatus become ruptured or fail due to a poor seal or leak. The prior art devices ordinarily do not prevent a loss of air from at least one tire if the device fails.

Thus it can be seen that a novel tire monitor has been provided which accomplishes all of its stated objectives.

I claim:

1. A tire monitor for use with a pair of pneumatic tires, comprising, an elongated, generally cylindrical body member having first and second ends, said body member having a first chamber formed therein, a diaphragm valve means mounted in said first chamber between said first and second ends to define first and second chamber portions, said diaphragm valve means being transversely disposed with respect to the longitudinal axis of said body member, a spring means, having first and second ends, in said first chamber portion at one side of said diaphragm valve means yieldably urging said diaphragm valve means towards said first end, said diaphragm valve means movable between first and second positions, a valve cap means secured to said first end of said body member and having a first air passageway formed therein in communication with the interior of one of said tires, a second air passageway formed therein in communication with the interior of the other of said tires, and a third air passageway formed therein in communication with said second chamber portion, valve means connected to said third passageway to permit air under pressure to be supplied to said second chamber portion at times, said diaphragm valve means preventing communication between said first and second air passageways when said diaphragm valve means is in its said first position and also preventing communication between said third air passageway and said first and second air passageways when said diaphragm valve means is in its said first position, said diaphragm valve means allowing communication between said first and second air passageways when said diaphragm valve means is in its said second position and also allowing communication between said third air passageway and said first and second air passageways when said diaphragm valve means is in its said second position, said spring means yieldably urging said diaphragm valve means towards its said first position with the air pressure in said first and second air passageways urging said diaphragm valve means towards its said second popsition, a piston slidably mounted in said first chamber portion adjacent said diaphragm valve means, said piston having a head portion adjacent said diaphragm valve means and a cylindrical skirt portion extending therefrom which defines a chamber portion in the other end of said piston, said piston being movable in a longitudinal direction parallel to the longitudinal axis of said body member, one end of said spring means being received by said chamber portion in said piston and being in engagement with said pistion for yieldably urging said diaphragm valve means towards its said first position, an elongated actuator rod longitudinally slidably mounted in said body member, said actuator rod having one end thereof extending into said chamber portion of said piston and being in contiguous engagement with said piston and extending therefrom parallel to the longitudinal movement of said piston and parallel to the longitudinal axis of said body member, a visual indicator means mounted on said second end of said body member and being movable between open and closed positions, the other end of said actuator rod being in direct contiguous engagement with said visual indicator means for moving said visual indicator means to its said open position when said diaphragm valve means is in its said first position, said visual indicator means comprising first and second arcuate members operatively pivotally secured together, a resilient member engaging said arcuate members for yieldably maintaining said arcuate members in their open position, the engagement of said actuator rod with said visual indicator means, when said diaphragm valve means is in its said second position, causing said arcuate members to move to their closed position, said spring means causing said diaphragm valve means to move to its said first position to prevent communication between said first and second air passageways if one of the tires experiences a predetermined loss of pressure.

2. The tire monitor of claim 1 wherein each of said arcuate members generaly defines a half-cylinder having one end thereof rounded, said half-cylinders, when spaced apart, defining a "cat's eye" configuration.

3. A tire monitor for use with a pair of pneumatic tires, comprising, a body member having first and second ends, said body member having a first chamber formed therein, a diaphragm valve means mounted in said first chamber between said first and second ends to define first and second chamber portions, a spring means in said first chamber portion at one side of said diaphragm valve means yieldably urging said diaphragm valve means towards said first end, said diaphragm valve means movable between first and second positions, a valve cap means secured to said first end of said body member and having a first air passageway formed therein in communication with the interior of one of said tires, a second air passageway formed therein communication with the interior of the other of said tires, and a third air passageway formed therein in communication with said second chamber portion, valve means connected to said third passageway to permit air under pressure to be supplied to said second chamber portion at times, said diaphragm valve means preventing communication between said first and second air passageways when said diaphragm valve means is in its said first position and also preventing communication between said third air passageway and said first and second air passageways when said diaphragm valve means is in its said first position, said diaphragm valve means allowing communication between said first and second air passageways when said diaphragm valve means is in its said second position and also allowing communication between said third air passageway and said first and second air passageways when said diaphragm valve means is in its said second position, said spring means yieldably urging said diaphragm valve means towards its said first position with the air pressure in said first and second air passageways urging said diaphragm valve means towards its said second position, a velocity valve movably mounted in said valve cap means in said third passageway at the other side of said diaphragm valve means, said velocity valve being movable between first and second positions, said third passageway including a cylindrical bore portion, said velocity valve including a hollow shank portion movably positioned in said cylindrical bore portion and an enlarged head portion adapted to seat upon the end of said cylindrical bore portion at times, said head portion having an opening formed therein which communicates with the interior of said hollow shank portion, said shank portion having an opening formed therein extending inwardly thereinto which communicates with the interior of said shank portion, said opening in said shank portion being sealed by the walls of said bore portion when said velocity valve is in its said first position and being exposed to the said other side of said diaphragm valve means when in its said second position.

* * * * *